United States Patent
Yildizyan et al.

(10) Patent No.: US 10,048,134 B2
(45) Date of Patent: Aug. 14, 2018

(54) NON-CONTACT MEDICAL THERMOMETER WITH DISTANCE SENSING AND COMPENSATION

(71) Applicant: Helen of Troy Limited, Belleville, St. Michael (BB)

(72) Inventors: Aleksan Yildizyan, Waltham, MA (US); Jiawei Hu, Foshan (CN); Charles Squires, Waltham, MA (US); James Christopher Gorsich, Los Angeles, CA (US)

(73) Assignee: Helen of Troy Limited, St. Michael (BB)

( * ) Notice: Subject to any disclaimer, the term of this patent is extended or adjusted under 35 U.S.C. 154(b) by 0 days.

(21) Appl. No.: 15/691,913

(22) Filed: Aug. 31, 2017

(65) Prior Publication Data

US 2018/0003563 A1   Jan. 4, 2018

Related U.S. Application Data

(63) Continuation of application No. 14/082,345, filed on Nov. 18, 2013.
(Continued)

(51) Int. Cl.
*G01J 5/02* (2006.01)
*G01J 5/00* (2006.01)

(52) U.S. Cl.
CPC ........... *G01J 5/0275* (2013.01); *G01J 5/0025* (2013.01); *G01J 2005/0048* (2013.01)

(58) Field of Classification Search
CPC .......... G01J 5/0275; G01J 5/0025; G01J 5/02; G01J 5/08; G01J 5/04; G01J 2005/0048
(Continued)

(56) References Cited

U.S. PATENT DOCUMENTS 4,343,182 A * 8/1982 Pompei ..................... G01J 5/02
374/117
2008/0246625 A1   10/2008 Chen et al.

FOREIGN PATENT DOCUMENTS

| CN | 201514281 | 6/2010 |
| CN | 102597723 | 7/2012 |

(Continued)

OTHER PUBLICATIONS

Japanese Office action filed in 2015-542379 dated Jul. 25, 2017.
(Continued)

*Primary Examiner* — Lisa Caputo
*Assistant Examiner* — Nathaniel T Woodward
(74) *Attorney, Agent, or Firm* — Rankin, Hill & Clark LLP

(57) ABSTRACT

A non-contact medical thermometer is disclosed that includes an IR sensor assembly having an IR sensor for sensing IR radiation from a target, a distance sensor configured to determine a distance of the thermometer from the target, and a memory component operatively coupled at least to the IR sensor assembly and the distance sensor. The memory component contains predetermined compensation information that relates to predetermined temperatures of targets and to predetermined distances from at least one predetermined target. A microprocessor is operatively coupled to the memory component. The microprocessor is configured to perform temperature calculations based on the IR radiation from the target, the distance of the thermometer from the target, and the predetermined compensation information.

32 Claims, 2 Drawing Sheets

Related U.S. Application Data

(60) Provisional application No. 61/728,015, filed on Nov. 19, 2012.

(58) Field of Classification Search
USPC .......................................... 374/121, 120, 100
See application file for complete search history.

(56) References Cited

FOREIGN PATENT DOCUMENTS

| | | | |
|---|---|---|---|
| EP | 0737869 | 10/1996 | |
| EP | 0737869 A2 * | 10/1996 | ............ G01S 7/4813 |
| EP | 2302342 | 3/2011 | |
| EP | 2302342 A1 * | 3/2011 | ............ G01J 5/0022 |
| JP | 2012-078160 | 4/2012 | |
| WO | 9006090 | 6/1990 | |
| WO | WO 9006090 A1 * | 6/1990 | ................ G01J 5/02 |
| WO | 2011151806 | 12/2011 | |
| WO | WO 2011151806 A1 * | 12/2011 | ............ G01J 5/0022 |

OTHER PUBLICATIONS

Chinese Office action dated May 2, 2017.
PCT International Search Report and Written Opinion from PCT/IB2013/003130 dated Jun. 4, 2014.
Guang-Yong, Jin et al., Method for partial vision temperature measurement by infrared thermometer, Proc. of SPIE, 2009, vol. 7383, pp. 738304-1-738034-16.

* cited by examiner

NON-CONTACT MEDICAL THERMOMETER WITH DISTANCE SENSING AND COMPENSATION

CROSS-REFERENCES TO RELATED APPLICATIONS

This application claims priority to U.S. provisional application No. 61/728,015, filed Nov. 19, 2012, the disclosure of which is incorporated herein by reference in its entirety.

FIELD OF THE INVENTION

The present invention relate generally to devices for measuring temperature, and more specifically, to non-contact infrared thermometers for medical applications.

DESCRIPTION OF RELATED ART

A thermal radiation or infrared (IR) thermometer is a device capable of measuring temperature without physically contacting the object of measurement. Thus, such thermometers are often called "non-contact" or "remote" thermometers. In an IR thermometer, the temperature of an object is taken by detecting an intensity of the IR radiation that is naturally emanated from the object's surface. For objects between about 0° C. and 100° C., this requires the use of IR sensors for detecting radiation having wavelengths from approximately 3 to 40 micrometers. Typically, IR radiation in this range is referred to as thermal radiation.

One example of an IR thermometer is an "instant ear" medical thermometer, which is capable of making temperature measurements of the tympanic membrane and surrounding tissues of the ear canal of a human or animal. Instant ear thermometers are exemplified by U.S. Pat. No. 4,797,840 to Fraden, which is incorporated by reference herein in its entirety. Other examples include medical thermometers for measuring surface skin temperatures (for example, a skin surface temperature of the forehead) as exemplified by U.S. Pat. No. 6,789,936 to Kraus et al., which is incorporated by reference herein in its entirety.

In order to measure the surface temperature of an object based on its IR radiation emissions, the IR radiation is detected and converted into an electrical signal suitable for processing by conventional electronic circuits. The task of detecting the IR radiation is accomplished by an IR sensor or detector.

Conventional thermal IR sensors typically include a housing with an infrared transparent window, or filter, and at least one sensing element that is responsive to a thermal radiation energy flux Φ emanating from an object's surface that passes through the IR window of the IR sensor and onto the sensing element. The IR sensor functions to generate an electric signal, which is representative of the net IR flux Φ existing between the sensing element and the object of measurement. The electrical signal can be related to the object's temperature by appropriate data processing.

In practice, users of medical thermometers are often concerned with determining a temperature of a subject (e.g., a person or animal) that an IR thermometer may be ill-suited to measure directly. Accordingly, some non-contact medical thermometers are designed to determine a temperature of a particular body part of a person based on measurements of a different body part. For example, there exist non-contact IR thermometers for determining a temperature of a subject's mouth (oral temperature) based on a measurement of a temperature of that subject's forehead. This determination is typically performed using a predetermined compensation function and/or a predetermined look-up table that has been determined based on clinically determined relationships between measured temperatures of a body part, e.g., a subject's mouth, and temperatures of a different body part, e.g., a subject's forehead.

Temperature readings produced by IR thermometers are somewhat sensitive to the distance between the IR sensor and a body part. Accordingly, IR thermometers that are capable of determining the distance between the IR sensor and a target may use this distance information to determine temperatures with greater accuracy than IR thermometers without these capabilities. For example, certain IR thermometers are designed to optimally measure the temperature of a body part when the IR thermometer is located a predetermined distance away from that object. U.S. Pat. No. 7,810,992 to Chen et al., which is herein incorporated by reference in its entirety, discloses an IR thermometer that includes a radiation emitter and receiver device. The radiation emitter and receiver device is capable of determining distance between the IR sensor and a target by: (1) emitting radiation that reflects off of a target; (2) receiving the reflected radiation; and (3) determining whether the distance is within a predetermined distance range based on the characteristics of the reflected radiation. In use, this IR thermometer performs a distance-measurement routine whereby it may determine when the IR thermometer is located within a predetermined distance range. Upon establishing that the IR thermometer is positioned within the predetermined distance range, the IR thermometer may then measure the temperature of the target.

While such techniques are capable of increasing the accuracy of temperature measurements, these techniques require the additional tasks of determining the IR thermometer's position and maintaining the thermometer at that position while the temperature is determined. These tasks are cumbersome and time consuming. Moreover, these tasks often result in user error, which may offset improvements in accuracy that such IR thermometers may otherwise provide. Accordingly, it would be of additional benefit to increase the accuracy of IR thermometers without requiring that the IR thermometer be positioned and maintained at a predetermined distance from the target.

SUMMARY OF THE INVENTION

A non-contact IR thermometer according to various embodiments of the present invention includes, among other things, an IR sensor, a distance sensor, a microprocessor, a memory configured to communicate with the microprocessor, and a user interface device configured to receive inputs from the microprocessor. The memory includes compensation information, e.g., a look-up table or mathematical equation that may be used to determine a compensated temperature of a body part based on a measurement of the same or another body part. For example, the compensation information may be used to determine a compensated temperature of a forehead based on a measured temperature of a forehead. Or, the compensation information may be used to determine a compensated oral or oral-equivalent temperature based on a measured temperature of a forehead. The IR thermometer may be configured to simultaneously or in sequence measure a temperature of the target object, the ambient temperature, or temperature of the thermometer, and a distance between the IR thermometer and the target. The microprocessor may use these values and the compensation information to determine a compensated temperature and communicate this temperature to the user interface device, which may further communicate the compensated temperature to a user.

BRIEF DESCRIPTION OF THE DRAWINGS

The foregoing and other features of the present invention will be more readily apparent from the following detailed description and drawing of illustrative embodiments of the invention in which.

DETAILED DESCRIPTION OF THE PREFERRED EMBODIMENTS

A remote IR thermometer is disclosed that includes, among other things, an IR sensor package or assembly having at least an IR sensor and a sensor for sensing the temperature of the IR sensor, a radiation emitter and receiver device, a microprocessor, a memory containing compensation information configured to communicate with the microprocessor, and a user interface device configured to receive inputs from the microprocessor. For the purpose of illustrating principles in accordance with various embodiments of the present invention, several non-limiting examples of the various embodiments are described below. Accordingly, the scope of the invention should be understood to be defined only by the scope of the claims and their equivalents, and not limited by the example embodiments.

Figure 1:
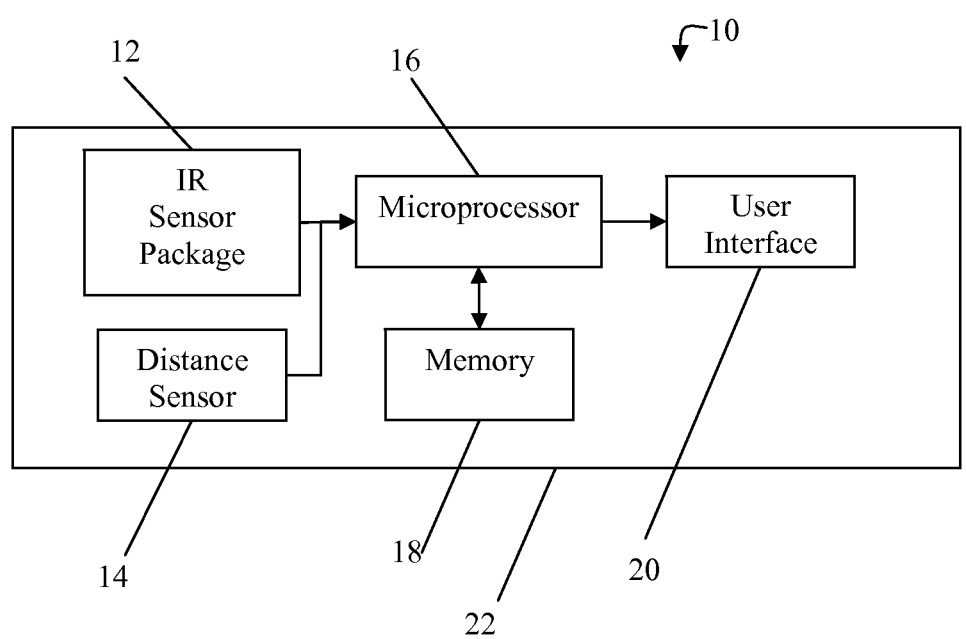
FIG. 1 is a block diagram representative of an embodiment of the present invention.

FIG. 1 is a block diagram illustrating an embodiment of the IR thermometer 10 of the present invention. This embodiment includes an IR sensor package/assembly 12, distance sensor 14, a microprocessor 16, memory 18, user interface device 20, and housing 22. Housing 22 contains each of the other components, and additionally includes at least a button and a circuit board with an electronic circuit and a power supply.

IR sensor package/assembly 12 includes an IR sensor and, in some embodiments, a temperature sensor for sensing the temperature of the IR sensor and/or the temperature of the ambient environment. The IR sensor is configured to capture thermal radiation emanating from a target object or target body part, e.g., a subject's forehead, armpit, ear drum, etc., which is converted into an electrical temperature signal and communicated, along with a signal regarding the temperature of the IR sensor as measured by the temperature sensor, to microprocessor 16, as is known in the art. Distance sensor 14 is configured to emit radiation from IR thermometer 10 and to capture at least a portion of the emitted radiation reflected from the target, which is converted into an electrical distance signal and communicated to microprocessor 16. Microprocessor 16 is configured to, among other things, determine a temperature value of the target based on the signal from IR sensor package/assembly 12, determine an ambient environment or thermometer temperature, and to determine a distance value corresponding to the distance between IR thermometer 10 and the target using a correlation routine based on the signal from distance sensor 14 and the characteristics of the reflected radiation. In various embodiments, the temperature signal, distance signal, temperature value, distance value, or any combination thereof may be stored in memory 18.

Memory 18 includes therein predetermined compensation information. This predetermined compensation information may be empirically predetermined by performing clinical tests. These clinical tests may relate the detected temperature of a target (e.g., forehead), the distance of the IR thermometer from the target, as well as the actual temperature of the target and the ambient environment or thermometer temperature. These clinical tests may further relate the temperature of the target, either the detected temperature, the actual temperature, or both, to, e.g., an actual oral or oral-equivalent temperature. Accordingly, target temperatures of various subjects having oral temperatures between, e.g., 94° Fahrenheit to 108° Fahrenheit, may be measured using an IR thermometer at various known distances from the targets, e.g., from 0 centimeters (i.e., thermometer contacts target) to 1 meter, in increments of, e.g., 1 centimeter, 5 centimeters, or 10 centimeters. In some embodiments, the range of distances corresponds to a range of distances over which IR thermometer 10 may be operational. Additionally, these measurements may be conducted in environments having various ambient temperatures between, e.g., 60° Fahrenheit to 90° Fahrenheit. These data may be used to create compensation information, such as a look-up table or mathematical function, whereby a compensated temperature of the target may subsequently be determined from a measured distance value, e.g., using distance sensor 14, a measured target temperature value, e.g., using IR sensor package or assembly 12, and, in some embodiments, an ambient environment temperature value and/or thermometer temperature value. In other embodiments, data relating to actual oral or oral-equivalent temperatures may be further used to create the compensation information, whereby a compensated oral or compensated oral-equivalent temperature may be determined from a measured distance value, a measured target temperature value, and, in some embodiments, an ambient environment temperature value and/or thermometer temperature value.

For example, where d is defined as a distance between the target and IR thermometer 10, the predetermined compensation information for obtaining a compensated temperature in degrees Fahrenheit may be a linear function or functions defined by the following relationships:

$$\text{Compensated Temperature} = \text{Target Temperature} + A*d + B$$

or $$\text{Compensated Temperature} = \text{Target Temperature} + C*d + D \quad \{\text{for } 0 < d \leq Y\}, \text{ and}$$

$$\text{Compensated Temperature} = \text{Target Temperature} + E*d + F \quad \{\text{for } Y < d \leq Z\},$$

where A, C, and E are coefficients having dimensions of Temperature/Length; B, D and F are coefficients having dimensions of Temperature; and Y and Z are distances from the target. Values of A, B, C, D, E, F, Y, and Z may be determined empirically from clinical tests. For purposes of illustration and not limitation, the following exemplary and approximate values for the coefficients and distances are provided: A=0.05, B=0.1, C=0.05, D=0.2, E=0.15, F=0.1, Y=15, and Z=30. However, as will be recognized by persons having ordinary skill in the art, other values for each coefficient and distance may be used depending on various design features and aspects of an IR thermometer 10.

It is also possible for the mathematical function to be of a higher degree or order, for example, a mathematical function that is non-linear with respect to the measured distance to obtain the compensated temperature, such as the following quadratic equation:

$$\text{Compensated Temperature} = \text{Target Temperature} + G*d^2 - H*d + L$$

Where G, H, and L are coefficients determined from the clinical tests. For purposes of illustration and not limitation, the following exemplary and approximate values for the coefficients are provided: G=0.001, H=0.15, and L=0.1. However, as will be recognized by persons having ordinary skill in the art, other values for each coefficient may be used depending on various design features and aspects of an IR thermometer 10.

The compensation information may alternatively be provided as various offset values, whereby, for each distance increment or range of distances from the target surface, there is a corresponding offset value. In various embodiments, these offsets may be fixed for each of the distance increments or range of distances from the target surface. For example, in various embodiments, the offset value may be, e.g., any one of 0.1° F., 0.2° F., or 0.5° F. over a range of distances from the target surface such as 0 cm to 5 cm, 0 cm to 20 cm, or 5 cm to 30 cm. For example, in one embodiment, the offset value may be 0.0° F. from 0.0 cm to 0.1 cm, 0.1° F. from 0.1 cm to 3.0 cm, 0.2° F. from 3.0 cm to 15 cm, and 0.5° F. from 15.1 cm to 30 cm. Alternatively, the compensation information may be in the form of a single, e.g., "best-fit," offset value that may be used to determine a compensated temperature from any of the target temperatures over a distance range, either the entire distance range recited above or a portion thereof. For example, the "best-fit" offset value may be, e.g., any one of 0.1° F., 0.2° F., or 0.5° F. For example, in one embodiment, the offset value may be 0.1° F. over the distance range from 0.0 cm to 10 cm, and 0.0° F. for greater distances. In other embodiments, the offset value may be 0.1° F. over the distance range from 0.0 cm to 30 cm, and 0.0° F. for distances greater than 30 cm.

In other embodiments, the compensation information may be in the form of a look-up table, which may be devised from predetermined information collected during clinical tests, such as actual target temperature, measured target temperature, ambient environment and/or thermometer temperature, and distance measurements, such that, subsequently, a compensated temperature may be determined by identifying in the look-up table those values that best correspond to the measured distance and measured target-temperature values. In the event of an imperfect match between the measured values and the table values, the closest table values may be used, or, additional values interpolated from the table values may be used. In other embodiments, the compensation information may include a combination of more than one of the approaches (e.g., mathematical function, offset value, look-up table) described above Further, as noted above, the ambient environment temperature value and/or thermometer temperature value may be used in generating compensation information. It may be beneficial to include these values as factors in the compensation information because these values may increase the accuracy of a compensated temperature calculated based on the compensation information. For example, the above discussed mathematical functions may be modified based on ambient environment temperature and/or thermometer temperature. For example, a first "best fit" offset value (e.g., 0.1° F.) may be used when the ambient temperature is within a first range of temperatures (e.g., 60° F. to 75° F.), and a second "best fit" offset value (e.g., 0.2° F.) may be used when the ambient temperature is within a second range of temperatures (e.g., 75° F. and 90° F.).

Microprocessor 16 is configured to use a temperature value corresponding to a target and a distance value corresponding to the distance between IR thermometer 10 and the target to determine a compensated temperature using the predetermined compensation information stored in memory 18. In some embodiments, Microprocessor 16 may be further configured to use an ambient and/or thermometer temperature in this determination. In some embodiments, the predetermined compensation information may be based in part on ambient and/or thermometer temperature. In those embodiments where the predetermined compensation information includes predetermined information concerning oral or oral-equivalent temperatures, Microprocessor 16 may be further configured to determine a compensated temperature corresponding to an oral or oral-equivalent temperature.

Microprocessor 16 may further store one or more compensated temperature values in memory 18 and communicate it to user interface device 20. In various embodiments, the microprocessor is further configured to interpolate additional values from any values stored in a look-up table in memory 18. User interface device 20 is configured to communicate the compensated temperature value to a user. For example, user interface device 20 may include, e.g., a display capable of displaying at least the compensated temperature value and/or a speaker configured to make an audible sound such as speaking the compensated temperature value or sounding an alarm.

Figure 2:
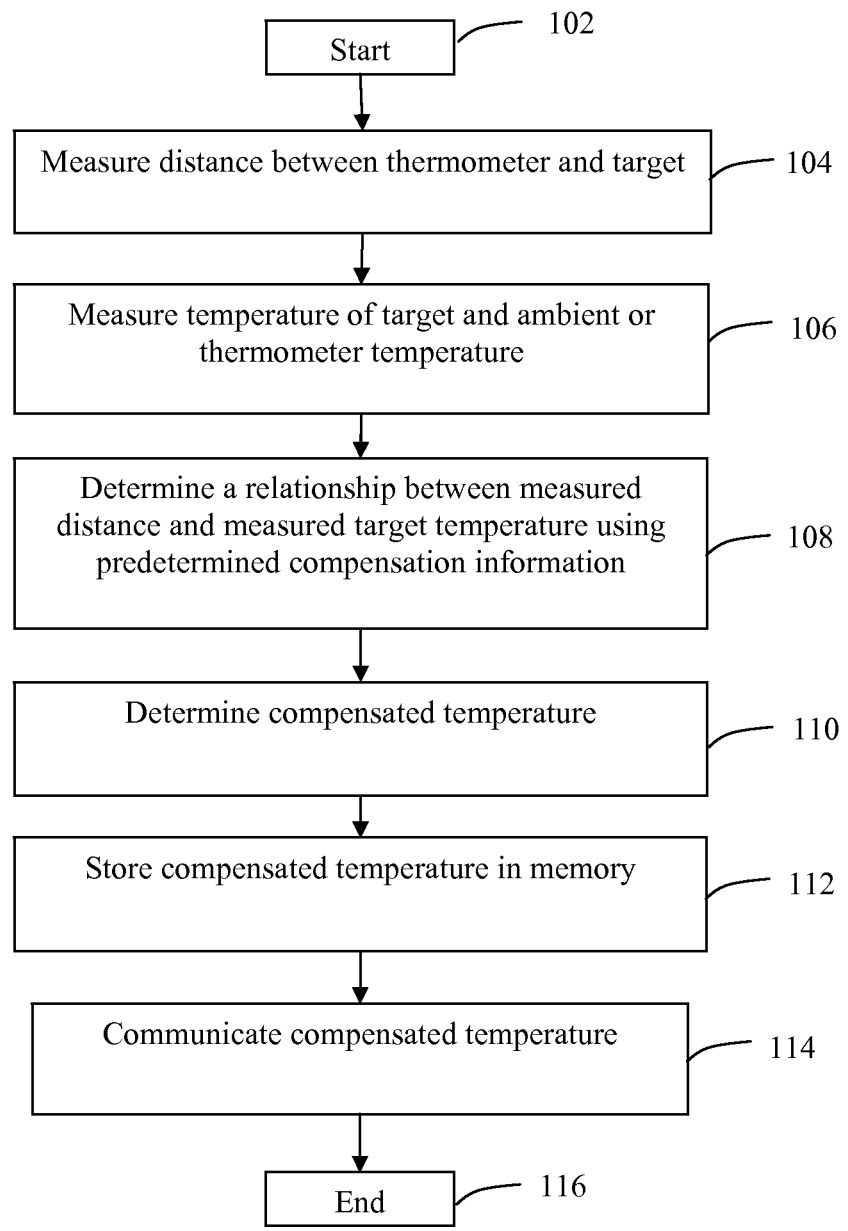
FIG. 2 is a flow chart showing the method for compensated temperature determination in accordance with an embodiment of the invention.

Referring to FIG. 2, the flow chart shows an embodiment of a method for determining a compensated temperature based on a measured temperature of a target on that subject, e.g., that subject's forehead. In step 102, the process for determining the compensated temperature starts, e.g., by the user depressing a start button to, e.g., activate IR thermometer 10. In step 104, distance sensor 14 is used to emit radiation and capture reflected radiation from a target to generate a distance signal, which is communicated to microprocessor 16. Microprocessor 16 determines a distance value from the distance signal, which microprocessor 16 may store in memory 18. In step 106, IR sensor package/assembly 12 is used to capture thermal radiation emanating from the target to generate a temperature signal, and, optionally, to capture an ambient and/or thermometer temperature, which are communicated to microprocessor 16. Microprocessor 16 determines a temperature value from the temperature signal, which microprocessor 16 may store in memory 18. In optional step 108, which is performed when the predetermined compensation information includes a look-up table, microprocessor 16 determines a relationship between the distance value and the temperature values using predetermined compensation information. In step 110 microprocessor 16 determines a compensated temperature value based on the predetermined compensation information. In step 112, microprocessor 16 stores the compensated temperature in memory 18. In step 114, the compensated temperature value is communicated using user interface 20.

While the various embodiments of the invention have been particularly shown and described, it will be understood by those skilled in the art that various changes in form and details may be made therein without departing from the spirit and scope of the invention. Accordingly, these embodiments are non-limiting examples of the invention and the invention should be understood to be defined only by the scope of the claims and their equivalents.

The invention claimed is:

1. A non-contact medical thermometer, comprising:
   an IR sensor assembly including an IR sensor for sensing IR radiation from a target area of a body;
   a distance sensor configured to determine a distance of the thermometer from the target area of the body;
   a memory component operatively coupled at least to the IR sensor assembly and the distance sensor, and containing predetermined compensation information that relates to predetermined temperatures of at least one predetermined target area of the body and predetermined distances from the at least one predetermined target area of the body; and
   a microprocessor operatively coupled to at least the memory component, and configured to determine a compensated temperature value which takes into account and varies based on the distance of the thermometer from the target area of the body in the determination of the compensated temperature value by using at least the IR radiation from the target area of the body, the distance of the thermometer from the target area of the body, and the predetermined compensation information.

2. The non-contact medical thermometer of claim 1 wherein the predetermined compensation information further relates to predetermined oral and/or oral-equivalent temperatures.

3. The non-contact medical thermometer of claim 1 wherein the predetermined temperatures of the at least one predetermined target area of the body are based on clinical measurements of the predetermined target area of the body.

4. The non-contact medical thermometer of claim 1 wherein the at least one target area of the body is a forehead.

5. The non-contact medical thermometer of claim 3 wherein the predetermined compensation information is configured as a linear mathematical function.

6. The non-contact medical thermometer of claim 5 wherein the linear mathematical function is $Tc=Tt+A*d+B$, where Tc is the compensated temperature value, Tt is a temperature of the target, where A and B are coefficients, and where d is the distance of the thermometer from the target area of the body.

7. The non-contact medical thermometer of claim 6 wherein A is approximately 0.05° F./cm and B is approximately 0.1° F.

8. The non-contact medical thermometer of claim 6, wherein A is approximately 0.05° F./cm and B is approximately 0.2° F. when d is less than or equal to approximately 15 cm, and wherein A is approximately 0.15° F./cm and B is approximately 0.1° F. when d is greater than approximately 15 cm.

9. The non-contact medical thermometer of claim 3 wherein the predetermined compensation information is configured as a look-up table.

10. The non-contact medical thermometer of claim 3 wherein the predetermined compensation information is configured as one or more offset values.

11. The non-contact medical thermometer of claim 10 wherein a first offset value is used for a first range of distances between the medical thermometer and the target area of the body and a second offset value is used for a second range of distances between the medical thermometer and the target area of the body.

12. The non-contact medical thermometer of claim 10 wherein the one or more offset values are between approximately 0.0° Fahrenheit and 5.0° Fahrenheit.

13. The non-contact medical thermometer of claim 10 wherein the one or more offset values is a single offset value of approximately 0.1° Fahrenheit.

14. The non-contact medical thermometer of claim 3 wherein the predetermined compensation information further relates to a temperature of the IR sensor.

15. The non-contact medical thermometer of claim 3 wherein the predetermined compensation information further relates to a temperature of the ambient environment.

16. The non-contact medical thermometer of claim 1,
   wherein the distance sensor is configured to emit a radiation toward the target area of the body, capture at least a portion of the emitted radiation reflected from the target area of the body, and communicate a distance signal to the microprocessor, and
   wherein the microprocessor is configured to determine a distance value corresponding to the distance between the thermometer and the target area of the body based on the distance signal and characteristics of the reflected radiation.

17. A method of determining a compensated temperature value, comprising:
   holding an IR thermometer adjacent to a target area of a body, the thermometer including a memory containing predetermined compensation information relating to at least one predetermined distance between the IR thermometer and the target area of the body, and at least one predetermined temperature of the target area of the body; and
   activating the IR thermometer to:
   measure a distance between the IR thermometer and the target area of the body;
   measure a temperature of the target area of the body; and
   determine a compensated temperature value which takes into account and varies based on the distance of the thermometer from the target area of the body in the determination of the compensated temperature value by using the predetermined compensation information, the distance measurement, and the target-temperature measurement.

18. The method of claim 17, wherein the target area of the body is a forehead.

19. The method of claim 17 wherein the predetermined compensation information is configured as a linear mathematical function.

20. The method of claim 19 wherein the mathematical function is $Tc=Tt+A*d+B$, where Tc is the compensated temperature value, Tt is a temperature of the target area of the body, where A and B are coefficients, and where d is the distance of the thermometer from the target area of the body.

21. The method of claim 20 wherein A is approximately 0.05° F./cm and B is approximately 0.1° F.

22. The method of claim 20 wherein A is approximately 0.05° F./cm and B is approximately 0.2° F. when d is less than or equal to approximately 15 cm, and wherein A is approximately 0.15° F./cm and B is approximately 0.1° F. when d is greater than approximately 15 cm.

23. The method of claim 17 wherein the predetermined compensation information is configured as a look-up table.

24. The method of claim 17 wherein the predetermined compensation information is configured as one or more offset values.

25. The method of claim 24 wherein a first offset value is used for a first range of distances between the IR thermometer and the target area of the body and a second offset value is used for a second range of distances between the IR thermometer and the target area of the body.

26. The method of claim 24 wherein the one or more offset values are between approximately 0.0° Fahrenheit and 5.0° Fahrenheit.

27. The method of claim 24 wherein the one or more offset values is a single offset value of approximately 0.1° Fahrenheit.

28. The method of claim 17 wherein the predetermined compensation information further relates to a temperature of an IR sensor of the IR thermometer.

29. The method of claim 17 wherein the predetermined compensation information further relates to a temperature of the ambient environment.

30. A non-contact medical thermometer, comprising:
- an IR sensor assembly including an IR sensor capable of sensing IR radiation from a user's forehead;
- a distance sensor configured to determine a distance of the thermometer from the user's forehead;
- a memory component operatively coupled at least to the IR sensor assembly and the distance sensor, and containing at least one predetermined offset value that relates clinically predetermined temperatures to forehead temperature values at predetermined distances from the forehead and a temperature of the ambient environment or the thermometer; and
- a microprocessor operatively coupled to at least the memory component, and configured to determine a compensated forehead temperature value which takes into account and varies based on the distance of the thermometer from the user's forehead in the determination of the compensated temperature value by using the IR radiation from the user's forehead, the distance of the thermometer from the user's forehead, and the predetermined offset value.

31. The non-contact medical thermometer of claim 30 wherein the one or more offset values are between approximately 0.0° Fahrenheit and 5.0° Fahrenheit.

32. The non-contact medical thermometer of claim 30 wherein the one or more offset values is a single offset value of approximately 0.1° Fahrenheit.

* * * * *